US010069293B2

(12) United States Patent
Meah et al.

(10) Patent No.: US 10,069,293 B2
(45) Date of Patent: Sep. 4, 2018

(54) ISOLATOR CIRCUIT

(71) Applicant: Tyco Fire & Security GmbH, Neuhausen am Rheinfall (CH)

(72) Inventors: Faruk Meah, Woking (GB); Andrew D. Naish, Staines (GB); Steven Ian Bennett, Sunbury (GB)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 15/058,623

(22) Filed: Mar. 2, 2016

(65) Prior Publication Data

US 2016/0181787 A1 Jun. 23, 2016

Related U.S. Application Data

(62) Division of application No. 14/831,977, filed on Aug. 21, 2015, now Pat. No. 9,673,615, which is a division
(Continued)

(30) Foreign Application Priority Data

Oct. 4, 2010 (GB) .................................. 1016684.1

(51) Int. Cl.
*H02H 3/24* (2006.01)
*G08B 25/04* (2006.01)
(Continued)

(52) U.S. Cl.
CPC ................. *H02H 3/24* (2013.01); *G08B 5/36* (2013.01); *G08B 25/045* (2013.01);
(Continued)

(58) Field of Classification Search
CPC ....... H02J 4/00; G08B 29/043; G08B 26/005; G08B 25/045; G08B 29/06; G08B 5/36;
(Continued)

(56) References Cited

U.S. PATENT DOCUMENTS 4,752,698 A 6/1988 Furuyama et al.
4,864,519 A * 9/1989 Appleby .............. G08B 26/005
340/10.41

(Continued)

FOREIGN PATENT DOCUMENTS

EP 0 191 239 A1 8/1986
EP 0101172 B2 3/1987
(Continued)

OTHER PUBLICATIONS

Great Britain Search Report, dated Apr. 6, 2011, for Great Britain Application No. GB1016684.1, filed on Oct. 4, 2010. One page.
(Continued)

*Primary Examiner* — Jung Kim
(74) *Attorney, Agent, or Firm* — HoustonHogle LLP

(57) ABSTRACT

An isolator circuit (25) for a unit of a safety system (10) includes a power control line (14) connectable to a first loop of a safety system and a power connection (16) connectable to a second loop of the safety system. A switch (26) is connected to the power control line (14), and the switch has a closed configuration and an open configuration. A controller (28) controls the configuration of the switch (26). If a voltage across the circuit (10) from the power connection (16) to the power control line (14) falls below a predetermined level, the controller (28) opens the switch (26), thereby causing a disconnection to occur in the first loop.

19 Claims, 2 Drawing Sheets

Figure 1:
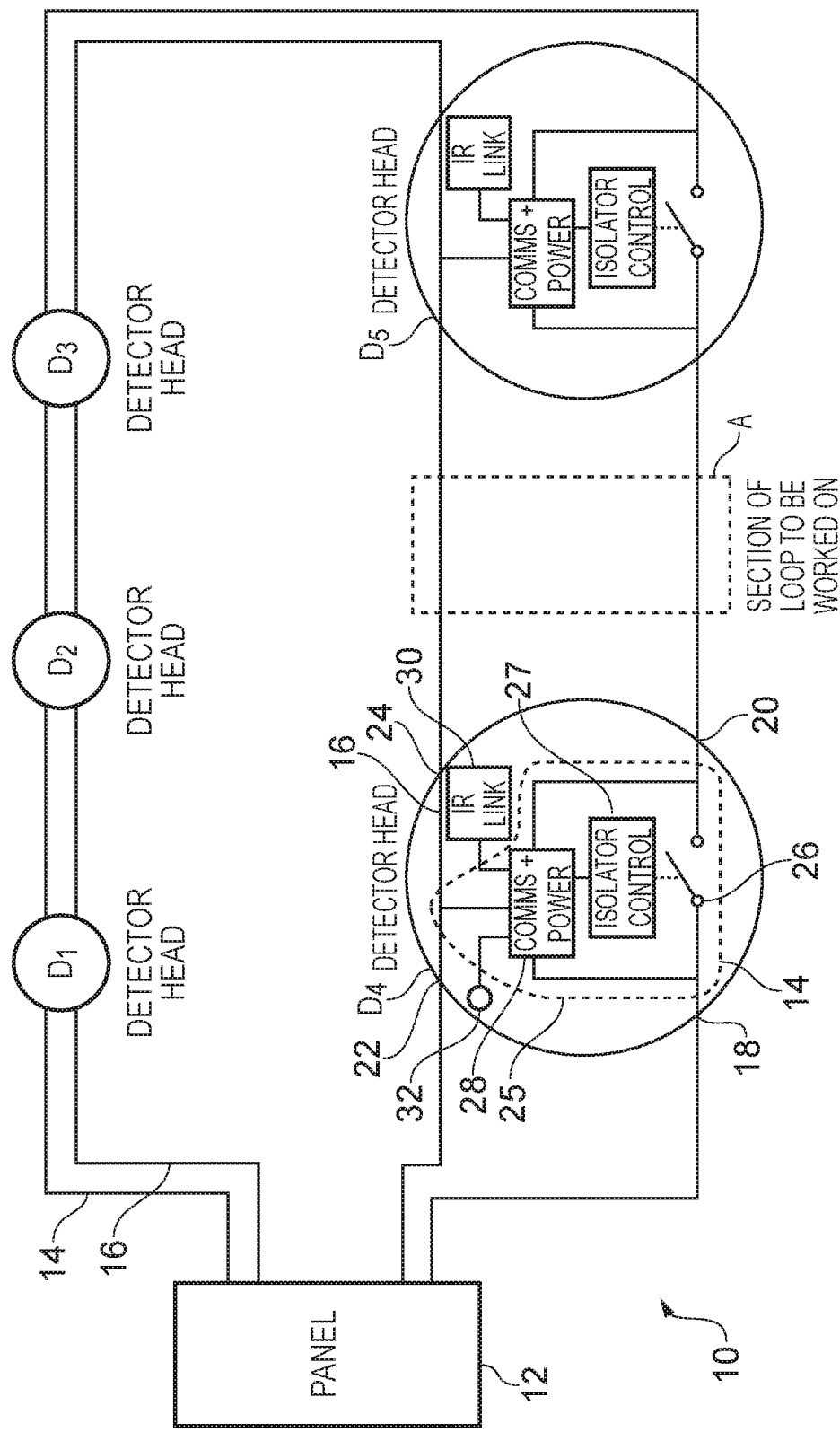

Related U.S. Application Data of application No. 13/877,056, filed as application No. PCT/GB2011/001444 on Oct. 4, 2011, now Pat. No. 9,153,968.

(51) Int. Cl.

| | | |
|---|---|---|
| *G08B 26/00* | (2006.01) | |
| *G08B 29/04* | (2006.01) | |
| *G08B 29/06* | (2006.01) | |
| *H02J 4/00* | (2006.01) | |
| *G08B 5/36* | (2006.01) | |
| *G08C 23/04* | (2006.01) | |
| *H02H 7/20* | (2006.01) | |

(52) U.S. Cl.
CPC ........... *G08B 26/005* (2013.01); *G08B 29/04* (2013.01); *G08B 29/043* (2013.01); *G08B 29/06* (2013.01); *G08C 23/04* (2013.01); *H02H 7/20* (2013.01); *H02J 4/00* (2013.01)

(58) Field of Classification Search
CPC . G08B 29/04; H02H 3/24; H02H 7/20; G08C 23/04
See application file for complete search history.

(56) References Cited

U.S. PATENT DOCUMENTS

| | | |
|---|---|---|
| 5,097,259 A | 3/1992 | Testa et al. |
| RE34,643 E | 6/1994 | Payne |
| 5,631,795 A | 5/1997 | Koyama |
| 5,801,913 A | 9/1998 | Pittel |
| 6,838,999 B1 | 1/2005 | Röpke |
| 6,859,193 B1* | 2/2005 | Yumoto ............... G09G 3/3216 315/169.3 |
| 7,593,751 B2* | 9/2009 | Barbosa ............... G06Q 10/06 340/8.1 |
| 8,111,999 B2* | 2/2012 | Ekkizogloy ............ H04B 10/40 398/135 |
| 8,675,324 B2* | 3/2014 | Noguchi .............. G08B 26/005 361/63 |
| 2001/0011892 A1 | 8/2001 | Ropke |
| 2002/0004386 A1* | 1/2002 | Simon ...................... G06F 8/65 455/419 |
| 2008/0211658 A1 | 9/2008 | Oppelt |
| 2009/0257159 A1* | 10/2009 | Imai .................... H01H 47/002 361/59 |
| 2010/0232080 A1 | 9/2010 | Schermann et al. |

FOREIGN PATENT DOCUMENTS

| | | |
|---|---|---|
| EP | 0 224 819 A1 | 6/1987 |
| GB | 2168517 B | 7/1988 |
| GB | 2 270 403 A | 3/1994 |
| GB | 2319408 A | 5/1998 |

OTHER PUBLICATIONS

International Search Report, dated Mar. 19, 2012, from International Application No. PCT/GB2011/001444, filed on Oct. 4, 2011.
International Preliminary Report on Patentability, dated Apr. 9, 2013, from International Application No. PCT/GB2011/001444, filed on Oct. 4, 2011.

\* cited by examiner

ISOLATOR CIRCUIT

RELATED APPLICATIONS

This application is a Division of U.S. application Ser. No. 14/831,977, filed on Aug. 21, 2015, which is a Division of U.S. application Ser. No. 13/877,056, filed on Aug. 2, 2013, which is a § 371 National Phase Application of International Application No. PCT/GB2011/001444, filed on Oct. 4, 2011, which claims priority to United Kingdom Application No. GB 1016684.1, filed on Oct. 4, 2010, all of which are incorporated herein by reference in their entirety.

This invention relates to an isolator circuit and, in particular, to an isolator circuit for a unit of a detector system. The invention also relates to a unit of a detector system.

Modern detector systems, such as fire detection systems, intruder detection systems and flood detection systems include a number of detector units and ancillary units which are connected to a common wired network together with a central control unit. The detector and ancillary units also receive power through the common wired network. The detector and ancillary units are normally connected to the control unit on one or more circuits, with each end of the circuit terminating at the control unit. Thus, if the circuit is broken at any one point, power and control signals can still reach every detector or ancillary unit because each end of the circuit is connected to the control unit. Alternatively, the detector and ancillary units can be connected to the control unit in other ways, such as on a spur.

In this specification, when 'units' are referred to, these include detector units to detect whatever it is that the system is designed to detect, as well as ancillary units having different functions, such as sounders for generating an audible alarm, flashing beacons which provide a visible alarm, isolation units which can be used to isolate parts of a detector circuit, alarm activation buttons and the like. Where it is a fire detector system, the detector unit might be a smoke detector, heat detector, flame detector or the like. Where the detector system is an emergency detector system, it will include suitable detectors for detecting an emergency, such as the presence of toxic gases, the presence of radioactivity, or some other suitable indicator of an emergency. In the case of an intrusion alarm system, the detector units might be movement detectors, heat detectors, pressure detectors and the like.

The detector and ancillary units of a detector system may be arranged on a plurality of loops. All of the loops may be connected to the same control unit, but each loop effectively functions as a separate system.

It may be necessary to isolate a section of a detector system, for example one loop, so that work may be carried out on a detector unit, or on the common wired network between two units. Alternatively, it may be necessary to install additional units in an existing detector system. In such circumstances, it is necessary to isolate the section of the system, or a particular loop, on which work is to be carried out.

In a known fire detection system, an isolator module is installed on each loop of the system, or a number of isolator modules may be installed at regular intervals along the wired network. While this arrangement allows a section of the fire alarm system to be isolated from communication with the central control unit and from its power supply, the isolator module will also isolate a number of detector units and ancillary units which require no work to be carried out thereon and, therefore, do not need to be isolated. During the period that the detector units are isolated, they are unable to detect a fire and, therefore, fire protection is limited where the units have been isolated. This arrangement has the clear disadvantage that the area covered by the isolator detectors is without a fire detection system while the detectors are isolated.

It is also desirable to protect a fire alarm system against short circuits forming in the detector or ancillary units, or in the wired network. In existing fire alarm systems, if a short circuit occurs, then an isolator module, or the central control unit may isolate the part of the system in which the short circuit occurs. Thus, a number of detector units may be disabled. Worse still, a short circuit in a fire alarm system may cause an entire loop, or even the whole system, to be disabled.

It is an aim of the present invention to overcome at least some of the above disadvantages.

According to a first aspect of the present invention, an isolator circuit for a unit of a detection system comprises a power control line; a power connection; a switch in the power control line, the switch having a closed configuration and an open configuration; and a controller for operating the switch; wherein the controller is arranged such that, when it receives an isolation signal, the controller opens or closes the switch, thereby causing a disconnection to occur in the power control line.

The isolator circuit provides an advantage that, if a short circuit occurs, then a switch is automatically opened, which prevents a surge of power passing through the detector or through the control line, which might damage either. By breaking the circuit, the section of the wired network which has been shorted is automatically isolated. However, due to the arrangement of the two control lines, power is still supplied to a detector incorporating the isolator circuit and, therefore, the detector can continue to function as part of the fire alarm system. The predetermined level of voltage, below which the switch will be caused to open, is preferably around 20 volts.

The switch may comprise a solid-state switch and, in particular, the switch may comprise a pair of field-effect transistors connected in series.

Preferably, the power control line is arranged for the bidirectional passage of voltage. The controller may be arranged to receive power from the power control line on both sides of the switch. Since the power control line is bidirectional, the controller is able to receive power from both sides of the switch and, therefore, if a short circuit occurs on one side of the switch, then the controller is able to receive power from the other side of the switch. The controller preferably includes a diode arrangement to separate the power control line on each side of the switch.

Advantageously, the power control line is arranged to carry a negative voltage.

The isolator circuit may be incorporated into an ASIC. This would allow the isolator circuit to easily be added into an existing detector or ancillary unit.

Preferably, the controller is such that, if the voltage across the power control line falls below a predetermined level for less than a predetermined period of time, the controller does not open the switch. This is to prevent the isolator circuit from opening the switch and, therefore isolating a unit or a section of the wired network, when the voltage momentarily falls below the predetermined voltage. The predetermined period of time may be around 10 milliseconds (ms). Such a momentary drop in voltage may be caused by a test being carried out on the alarm system.

According to a second aspect of the present invention, a unit for a safety system comprises an isolator circuit according to the claims. By incorporating the isolator circuit into the unit, the unit is protected from damage in the event that a short circuit occurs on either side of the isolator switch. If adjacent units on a wired network include isolator circuits, then it is possible to isolate a section of the network between the detectors so that work may be carried out thereon. The detectors are still able to function as part of the safety system, since power is supplied to them through the power connection.

Preferably, the unit further comprises an optical data receiver for receiving an optical data signal from an external source. The configuration of the switch may be controllable via the optical data receiver. An advantage of this is that an engineer that needs to carry out work on a particular detector, or on a section of network between detectors is able to isolate the detector or the section of network remotely, by sending an optical data signal to the controller via the optical data receiver.

Advantageously, the unit further comprises a visual indicator for indicating when the switch is open. The visual indicator may be an LED. This allows an engineer, or any other person on the ground to see when the switch in a particular unit is open. Consequently, the person is able to easily determine which part of the wired network or which detector is isolated from the system.

Preferably, the safety system is a detector system and the unit is a detector unit.

According to another aspect, a unit for a detection system comprises: an isolator circuit having a power control line, a power connection, a switch in the power control line, the switch having a closed configuration and an open configuration, and a controller for controlling the operation of the switch; and an optical data receiver for receiving an optical data signal from an external source; wherein the operation of the switch is operable via the optical data receiver.

According to a further aspect, a detection system comprises: a central control unit; a plurality of units connected to the central control unit via a wired network; wherein each unit comprises an isolator circuit including an isolator switch, the switch being operable by the central control unit.

The invention will now be described in greater detail, by way of example, with reference to the drawings, in which:—

Figure 2:
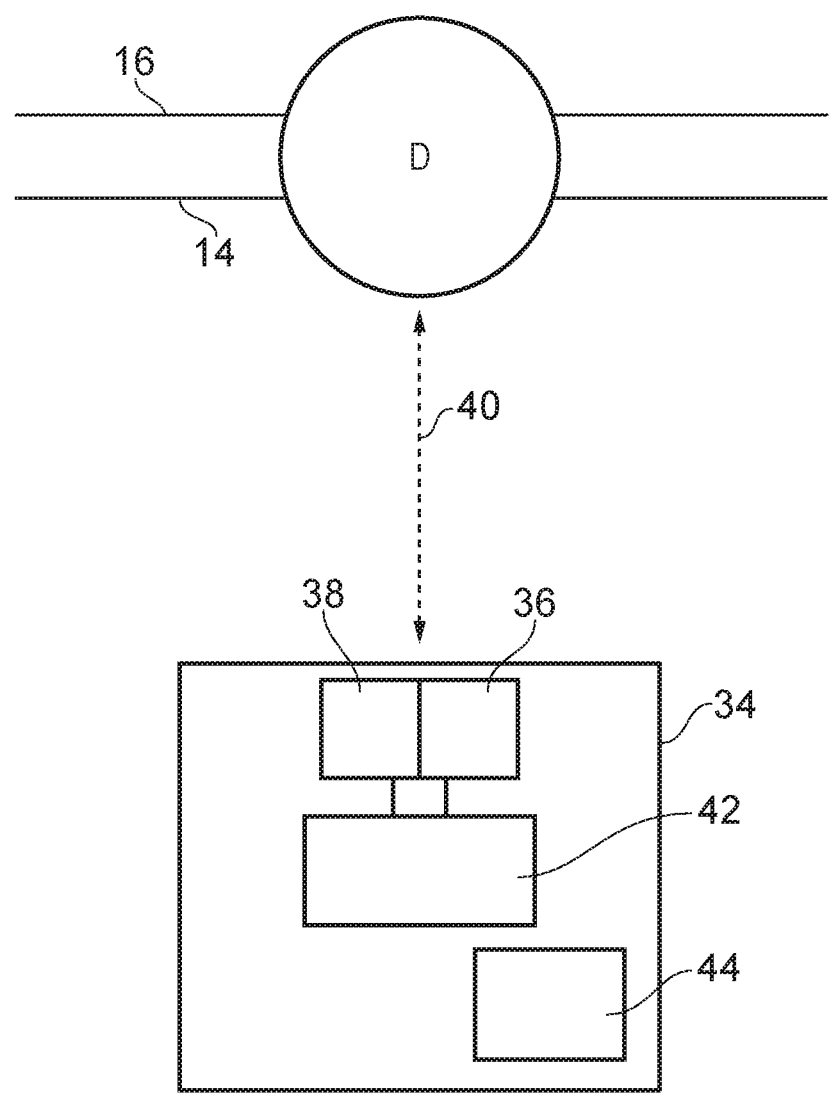

FIG. 1 is schematic view of a detection system constructed in accordance with the invention; and FIG. 2 is a schematic view of a detector and a remote communication device constructed in accordance with the invention.

Referring to the drawings. FIG. 1 shows a detection system 10 having a central control unit 12, a plurality of detector units, labelled D1 to D5, and two control lines 14, 16 connecting the central control unit to the detector units. It will, of course, be appreciated that, while only five detector units are shown in this embodiment, the detection system 10 may include any number of detector units connected to the control lines 14, 16. The control system 10 may also include ancillary units (not shown), such as sounder units, strobe indicator units and alarm activation units.

The control lines 14, 16 form a single loop, beginning and ending at the central control unit 12. In this embodiment, the system 10 has only one loop. In other embodiments, however, a system 10 might have a plurality of loops, each loop connecting a plurality of detector units to the central control unit 12.

For the purpose of this description, two detectors D4 and D5 are shown enlarged in FIG. 1. The detector units hereinafter will be referred to generally as D. The detector D is connected to both control lines 14, 16. The power control line 14 supplies a negative voltage, and is connected to the detector D via a first negative input 18 and via a second negative input 20. The power control line 16 carries a positive voltage, and is connected to the detector D via a first positive input 22 and via a second positive input 24.

The components shown within the area in the detector D delimited by the dashed line form an isolator circuit 25. The isolator circuit 25 may be packaged within a housing, so that it can be mounted into a printed circuit board and integrated within new or existing components. Alternatively, the isolator circuit 25 may be formed on an application specific integrated circuit (ASIC) which can be incorporated into an electrical component.

Within the isolator circuit 25, the negative control line 14 includes a switch 26, having a first, closed configuration, and a second, open configuration. When the switch is in its closed configuration (not shown), current is able to flow through the detector D along the negative control line 14. When the switch is in its open configuration (as shown in FIG. 1), current is prevented from flowing along the negative control line 14. In this embodiment, the switch 26 is a solid state switch, and is formed by a pair of field-effect transistors (FET) connected to one another in series.

A controller 28 is connected between the positive control line 16 and the negative control line 14, on both sides of the switch 26. That is, the controller 28 is connected to the negative control line 14 between the first negative input 18 and the switch 26, and between the second negative input 20 and the switch. The controller 28 includes a power module (not shown) for supplying the isolator circuit with power from the control lines 14, 16 and circuitry (not shown) for enabling communication with the central control unit 12. The controller 28 also controls the switch 26 via an isolator control 27, causing it to switch from its open configuration to its closed configuration, and vice versa. Diodes (not shown) in the controller 28 prevent voltage from passing from the negative control line 14 on one side of the switch 26 to the negative control line on the other side of the switch through the controller.

Within the detector unit D, but not forming part of the isolator circuit 25, is an infrared (IR) data transceiver 30 capable of receiving externally transmitted IR data signals, and transmitting IR data signals to an external IR data receiver. The IR data transceiver 30 is in communication with the controller 28. If the IR data transceiver 30 receives an IR signal containing instructions for the switch to be opened, it will send that signal to the controller 28, and the controller will open the switch 26. The function of the IR data transceiver will be described in greater detail with reference to FIG. 2.

The detector D includes an LED 32 which is visible externally from the detector, and which acts as a visual indicator of the position of the isolator switch 26. The controller 28 illuminates the LED 32 if switch 26 is opened and, therefore, a person looking at the detector D is able to tell if the isolator switch 26 has been opened.

Referring now to FIG. 2, a remote communication device 34 is shown along with a detector D connected to control lines 14, 16. The control lines 14, 16 form part of a complete safety system 10, as shown in FIG. 1.

The remote communication device 34 includes an infrared data transmitter 36 and an infrared data receiver 38 for transmitting and receiving infrared signals 40 respectively. The IR transmitter 36 and receiver 38 are connected to a processor 42 which is, in turn, connected to a user interface 44. The user interface 44 is capable of displaying information to a user and receiving inputs from the user via a keypad or touchpad (not shown). Information input by a user is processed by the processor 42, and can be transmitted by the IR transmitter 36 as an infrared signal 40 to the detector D. The signal 40 is received by the IR transceiver 30 in the detector D.

In normal use, the isolator switch 26 will be in its closed configuration. The controller 28 will open the switch if it receives an instruction to do so, or if it detects a short circuit in the system.

EXAMPLE 1

If a short circuit occurs in, say, the section of the loop marked A in FIG. 1, then the voltage in the detector D4 across the connection from the positive control line 16 to the second input 20 of the negative control line 14 will rapidly fall. If this voltage falls below a predetermined value which, in this embodiment is 20 volts, then the controller 28 causes the switch 26 to open via the isolator control 27. When the switch 26 is opened, current is unable to flow along the negative control line 14 from the input 18 to the input 20 or vice versa. However, current is still able to flow between the input 24 to the input of the positive control line 22 and, therefore, the detector still receives a supply of power. When the controller 28 opens the switch via the isolator control 27, it also illuminates the LED 32 so that one can tell that the switch 26 on that particular detector has been opened. A signal may also be sent by the controller 28 to the central control unit 12.

A rapid drop in voltage will also be detected by the controller in the detector D5 which is the other side of the section A in which the short circuit occurs. Thus, the switch in D5 will also be opened, and the negative control line 14 in the section A will be totally isolated from the system.

EXAMPLE 2

It may be desirable to isolate a section A of the system, for example to install an additional detector unit. To isolate the section A of the loop, an engineer begins by enabling the IR system. He does this by activating the IR mode from the central control unit. The central control unit sends an IR enable signal to the detector units which causes them to enter IR mode where the IR receivers are operational. It will be understood that it is undesirable to run the IR system all the time because of the extra load that it would apply to the system, and also because it offers a possible vulnerability to the system.

Once the IR system has been enabled, the engineer positions himself near the detector D4 that is on one side of section A of the loop. The engineer aims the remote communication device 34 at the detector D4, and enters a command or isolation signal via the user interface 44 to open the switch 26 in detector D4. The signal 40 is sent via the IR transmitter 36 to the IR transceiver 30 of detector D4. The processor of detector D4 processes the signal and opens the switch 26 in the detector D4. The LED 32 is illuminated to give a visual indication that the isolator switch is open.

The isolator signal would normally include the unique address of the detector being controlled, thereby avoiding other nearby detectors being inadvertently instructed to switch on their isolator switches. Other ways of identifying the detector that is to be controlled are possible, for example by using labels or identities that detectors are able to recognise as indicating that the signal to switch the isolator switch on or off is intended as being for them.

The engineer then locates detector D5, which is the detector the other side of the section A of the loop to be isolated. The engineer repeats the above actions, using the remote communication device 34 to instruct the controller in the detector D5 to open that detector's switch. With the switches 26 of detectors D4 and D5, open, no current is able to flow through section A of the loop, and the engineer is safely able to carry out work on that section, such as installing an additional detector.

While section A of the loop is isolated, the rest of the loop, and the detectors D on the loop, are still supplied with power and are, therefore, still able to function. Thus, the area covered by the fire detection system 10 is not reduced while work is carried out on section A of the loop.

When the engineer has completed the work on section A of the loop, has installed a new detector, or has completed the work on or replaced the detector, he must reinstate the detector or detectors that were isolated. To do this, he locates himself near the detector and enters an instruction in the form of an isolation signal into the remote communication device 34 to instruct the controller 28 to close the switch 26 via the isolator control 27. The controller 28 closes the switch 26 and current is again able to flow along the negative control line in the detector. The LED 32 is extinguished, indicating that the isolator switch is closed. The engineer repeats this process with any other detectors which have open switches.

Finally, the engineer returns to the central control unit and switches off the IR mode. A signal is sent to the detectors disabling the IR receivers.

EXAMPLE 3

Instead of using the remote communication device 34 to instruct the controllers in the detectors D to close the switches, the engineer may enter his instructions into the central control unit 12 via a user interface (not shown). The engineer enters the unique address of the detector that he wishes to instruct. The instructions are then sent by the central control unit, via the control lines 14, 16, to the detector. The controller closes the switch of the detector in the same way as it would had the instructions been sent via the remote communication unit.

Instead of using the remote communication device to instruct the switches to be closed when the work is complete, the engineer may enter the instructions into the central control unit 12.

EXAMPLE 4

It might be necessary for an engineer to carry out work on, or replace, an existing detector in the loop of a system 10. To do this, the engineer locates the detector to be worked on or replaced. Using the remote communication device 34, the engineer sends a signal to the detectors on either side of the one to be worked on, instructing the controllers of those detectors to open their switches. With the switches of those two detectors opened, no current is able to flow between them and, therefore, no current flows through the detector to be worked on or replaced. The engineer is then able to carry out the necessary work, or replace the detector. While the work is carried out, the detectors on either side still receive power and are still connected to the central control unit 12.

In the embodiment described, the detectors have been described as having an IR receiver and an IR transmitter. Of course, if it is only desired to control the switch from the central control unit, the IR receiver and transmitter will not be required. Even if it is intended to be able to control the isolator switch using the IR link, the IR transmitter within the detector may not be required. Likewise, the IR receiver of the remote communication device might not be required.

It will be appreciated by a person skilled in the art that various modifications may be made to the invention without departing from the claims.

The invention claimed is:

1. An isolator circuit for a unit of a detection system, the isolator circuit comprising:
   a first power control line and a second power control line;
   a first power connection connected to the first power control line and a second power connection connected to the second power control line;
   a switch in the first power control line, the switch having a closed configuration and an open configuration; and
   a controller for operating the switch;
   wherein the controller is arranged to measure a power supply voltage across the circuit from the first and second power control lines, and if the voltage falls below a predetermined level, the controller opens the switch, thereby causing a disconnection to occur in the first power control line, wherein a first input connects the controller to the first power control line at a first point of the first power control line and a second input connects the controller to the first power control line at a second point of the first power control line, the first point and the second point of the first power control line are positioned on opposing sides of the switch with respect to each other, and the controller is configured to receive power via both the first input and the second input regardless of the switch being open.

2. An isolator circuit according to claim 1, wherein the switch comprises a solid-state switch.

3. An isolator circuit according to claim 1, wherein the switch comprises a pair of field-effect transistors connected in series.

4. An isolator circuit according to claim 1, wherein the power control line is arranged to carry a negative voltage.

5. An isolator circuit according to claim 1, wherein the controller is arranged to receive power from the power control line on both sides of the switch.

6. An isolator circuit according to claim 5, wherein the controller includes a diode arrangement to separate the power control line on each side of the switch.

7. An isolator circuit according to claim 1, wherein the isolator circuit is incorporated into an ASIC.

8. An isolator circuit according to claim 1, further comprising a second power control line, and wherein the controller is such that, if a voltage between the power control lines falls below a predetermined level for less than a predetermined period of time, the controller does not open the switch.

9. A unit for a safety system, comprising an isolator circuit, the isolator circuit comprising:
   a first power control line and a second power control line;
   a first power connection connected to the first power control line and a second power connection connected to the second power control line;
   a switch in the first power control line, the switch having a closed configuration and an open configuration; and
   a controller for operating the switch;
   wherein the controller is arranged to measure a power supply voltage across the circuit from the first and second power control lines, and if the voltage falls below a predetermined level, the controller opens the switch, thereby causing a disconnection to occur in the first power control line, wherein a first input connects the controller to the first power control line at a first point of the first power control line and a second input connects the controller to the first power control line at a second point of the first power control line, the first point and the second point of the first power control line are positioned on opposing sides of the switch with respect to each other, and the controller is configured to receive power via both the first input and the second input regardless of the switch being open.

10. A unit according to claim 9, further comprising an optical data receiver for receiving an optical data signal from an external source.

11. A unit according to claim 10, wherein the switch is operable via the optical data receiver.

12. A unit according to claim 9, further comprising a visual indicator for indicating when the switch is open.

13. A unit according to claim 12, wherein the visual indicator is an LED.

14. A unit according to claim 9, wherein the safety system is a detector system and the unit is a detector unit.

15. A detection system comprising an isolator circuit, the isolator circuit comprising:
   a first power control line and a second power control line;
   a first power connection connected to the first power control line and a second power connection connected to the second power control line;
   a switch in the power control line, the switch having a closed configuration and an open configuration; and
   a controller for operating the switch; and
   a remote control device arranged to communicate with the circuit;
   wherein the controller is arranged to measure a power supply voltage across the circuit from the first and second power control lines, and if the voltage falls below a predetermined level, the controller opens the switch, thereby causing a disconnection to occur in the first power control line, wherein a first input connects the controller to the first power control line at a first point of the first power control line and a second input connects the controller to the first power control line at a second point of the first power control line, the first point and the second point of the first power control line are positioned on opposing sides of the switch with respect to each other, and the controller is configured to receive power via both the first input and the second input regardless of the switch being open.

16. An isolator circuit according to claim 1, wherein the controller opens the switch via an isolator control of the isolator circuit in response to the voltage between the second power control line and either one of the first input connecting the controller to the first power control line and the second input connecting the controller to the first power control line being below the predetermined level.

17. An isolator circuit according to claim 16, wherein the controller continues to receive power via one of the first or second inputs connecting the controller to the first power control line when the switch is in an open configuration and the voltage between the second control line and one of the first and second inputs connecting the controller to the first power control line remains above the predetermined level.

18. An isolator circuit according to claim 1, wherein the controller opens the switch via an isolator control of the isolator circuit in response to the voltage between the second power control line and either one of the first input connecting the controller to the first power control line and the second input connecting the controller to the first power control line being below 20 volts.

19. An isolator circuit according to claim 1, wherein the controller includes a diode arrangement to separate portions of the first power control line on different sides of the switch.

* * * * *